United States Patent
He et al.

(10) Patent No.: US 12,262,223 B2
(45) Date of Patent: Mar. 25, 2025

(54) SYSTEMS AND METHODS FOR REFERENCE SIGNALING DESIGN AND CONFIGURATION IN WIRELESS COMMUNICATION NETWORKS

(71) Applicant: ZTE CORPORATION, Guangdong (CN)

(72) Inventors: Zhen He, Shenzhen (CN); Shujuan Zhang, Shenzhen (CN); Chuangxin Jiang, Shenzhen (CN); Yu Pan, Shenzhen (CN); Bo Gao, Shenzhen (CN); Zhaohua Lu, Shenzhen (CN)

(73) Assignee: ZTE Corporation, Shenzhen (CN)

(*) Notice: Subject to any disclaimer, the term of this patent is extended or adjusted under 35 U.S.C. 154(b) by 323 days.

(21) Appl. No.: 17/853,171

(22) Filed: Jun. 29, 2022

(65) Prior Publication Data
US 2022/0330045 A1    Oct. 13, 2022

Related U.S. Application Data

(63) Continuation of application No. PCT/CN2020/073451, filed on Jan. 21, 2020.

(51) Int. Cl.
*H04W 16/28* (2009.01)
*H04L 5/00* (2006.01)
(Continued)

(52) U.S. Cl.
CPC .......... *H04W 16/28* (2013.01); *H04L 5/0051* (2013.01); *H04W 72/046* (2013.01); *H04W 72/23* (2023.01)

(58) Field of Classification Search
None
See application file for complete search history.

(56) References Cited

U.S. PATENT DOCUMENTS 8,942,207 B2 * 1/2015 Son ................ H04W 36/0058
370/331
9,078,141 B2 * 7/2015 Hwang ................ H04B 7/024
(Continued)

FOREIGN PATENT DOCUMENTS

CN    109076378 A    12/2018
CN    109495151 A    3/2019
(Continued)

OTHER PUBLICATIONS

Extended European Search Report on EP 20886287.0 dated Aug. 10, 2023 (12 pages).
(Continued)

*Primary Examiner* — Eunsook Choi
(74) *Attorney, Agent, or Firm* — Foley & Lardner LLP (57) ABSTRACT

Systems and methods for reference signaling design and configuration in wireless communication networks is discussed herein. In one embodiment, the systems and methods are configured to determine, by a wireless communication device, an activated beam state applicable to a downlink signal received from a wireless communication node. The systems and methods can be further configured to determine, by the wireless communication device based at least on the activated beam state, a first information of an uplink signal to the wireless communication node, the uplink signal associated with an uplink resource.

12 Claims, 4 Drawing Sheets

(51) Int. Cl.
*H04W 72/044* (2023.01)
*H04W 72/23* (2023.01)
*H04W 72/04* (2023.01)

(56) References Cited

U.S. PATENT DOCUMENTS

| | | | |
|---|---|---|---|
| 9,252,864 B2* | 2/2016 | Seol | H04B 7/0617 |
| 11,368,270 B2* | 6/2022 | Chen | H04W 52/365 |
| 2013/0065622 A1* | 3/2013 | Hwang | H04B 7/024 |
| | | | 455/500 |
| 2013/0217404 A1* | 8/2013 | Jung | H04W 52/04 |
| | | | 455/452.1 |
| 2018/0227031 A1* | 8/2018 | Guo | H04W 24/10 |
| 2019/0387547 A1 | 12/2019 | Shin et al. | |
| 2021/0067382 A1* | 3/2021 | Manolakos | H04W 76/27 |
| 2022/0224479 A1* | 7/2022 | He | H04L 5/0048 |
| 2023/0208490 A1* | 6/2023 | Kim | H04B 7/0626 |
| | | | 370/329 |

FOREIGN PATENT DOCUMENTS

| | | |
|---|---|---|
| CN | 110535617 A | 12/2019 |
| JP | 2022-550047 A | 11/2022 |
| WO | WO-2018/217063 A1 | 11/2018 |
| WO | WO-2019/160713 A1 | 8/2019 |
| WO | WO-2021/056506 A1 | 4/2021 |

OTHER PUBLICATIONS

Qualcomm Incorporated, "Multi-TRP Enhancements," 3GPP TSG-RAN WG1 Meeting #99; R1-1912967; Nov. 18-22, 2019; Reno, Nevada, USA (21 pages).
First Office Action for JP Appl. No. 2022-539677, dated Jul. 11, 2023 (with English translation, 7 pages).
Qualcomm Incorporated, "Enhanced TCI States Activation/Deactivation PDSCH MAC CE for Multi-TRP", 3GPP TSG-RAN WG2 Meeting #107bis, R2-1916066, Nov. 22, 2019, Reno, Nevada, US (6 pages).
First Examination Report on AU 2020383209 dated Jun. 28, 2023 (7 pages).
ZTE: "Enhancements on multi-beam operation," 3GPP TSG RAN WG1 Meeting #98bis; R1-1910285; Oct. 14-20, 2019; Chongqing, China (24 pages).
Asia Pacific Telecom: "Discussion on Multi-beam Operations" 3GPP TSG-RAN WG1 Meeting #98bis, RI1-1910847, Oct. 20, 2019(Oct. 20, 2019) Chongqing, China (6 pages).
Asia Pacific Telecom: "Discussion on Multi-beam Operations" 3GPP TSG-RAN WG1 Meeting #99, R1-1912248, Nov. 22, 2019(Nov. 22, 2019) Reno, USA (5 pages).
Intel Corporation: "Discussion on multi-beam enhancements" 3GPP TSG RAN WG1 Meeting #99, R1-1912223, Nov. 22, 2019(Nov. 22, 2019) (10 pages).
International Search Report and Written Opinion for PCT Appl. No. PCT/CN2020/073451 mailed Oct. 23, 2020 (7 pages).
Mediatek Inc.: "Futher Details on Beam Management" 3GPP TSG RAN WG1 Meeting #91, R1-1719565, Dec. 1, 2017(Dec. 1, 2017), Reno, USA (8 pages).
Nokia et al: "Enhancements on Multi-beam Operation" 3GPP TSG RAN WG1 #97 Meeting, R1-1907317, May 17, 2019(May 17, 2019) Reno, Nevada (22 pages).
Samsung: "Further Discussion on Enhancement on UL/DL Transmit Beam Selection with Reduced Latency and Overhead" 3GPP TSG-RAN WG4 Meeting #93 Nov. 22, 2019 (Nov. 22, 2019) Reno, USA (3 pages).
Samsung: "New WID: Further enhancements on MIMO for NR" 3GPP TSG RAN Meeting #86, RP-193133, Dec. 12, 2019(Dec. 12, 2019), Sitges, Spain (5 pages).
First Office Action for CN Appl. No. 2020800936405, dated Mar. 19, 2024 (with English translation, 43 pages).
Notice of Reasons for Rejection for JP App. No. 2022-539677 dated Jan. 18, 2024 (with English translation, 6 pages).

* cited by examiner

SYSTEMS AND METHODS FOR REFERENCE SIGNALING DESIGN AND CONFIGURATION IN WIRELESS COMMUNICATION NETWORKS

CROSS-REFERENCE TO RELATED APPLICATION

This application claims the benefit of priority under 35 U.S.C. § 120 as a continuation of PCT Patent Application No. PCT/CN2020/073451, filed on Jan. 21, 2020, the disclosure of which is incorporated herein by reference in its entirety.

TECHNICAL FIELD

The disclosure relates generally to wireless communications and, more particularly, to systems and methods for design and configuration of reference signals for uplink and downlink communications.

BACKGROUND

Wireless communication networks can include network communication devices and network communication nodes. In some instances, the network communication devices and nodes can use analog beam forming mechanism to communicate with each other.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

In one embodiment, a method includes determining, by a wireless communication device, one or more activated beam states, wherein the one or more activated beam states is applicable to a downlink (DL) signal. The method further includes determining, by the wireless communication device based at least on the one or more activated beam states, a first information, where the first information includes at least one of a beam of an uplink (UL) signal or a power control parameter of an UL signal. The method also includes transmitting, by the wireless communication device, the UL signal. The above and other aspects and their implementations are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE EMBODIMENTS

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
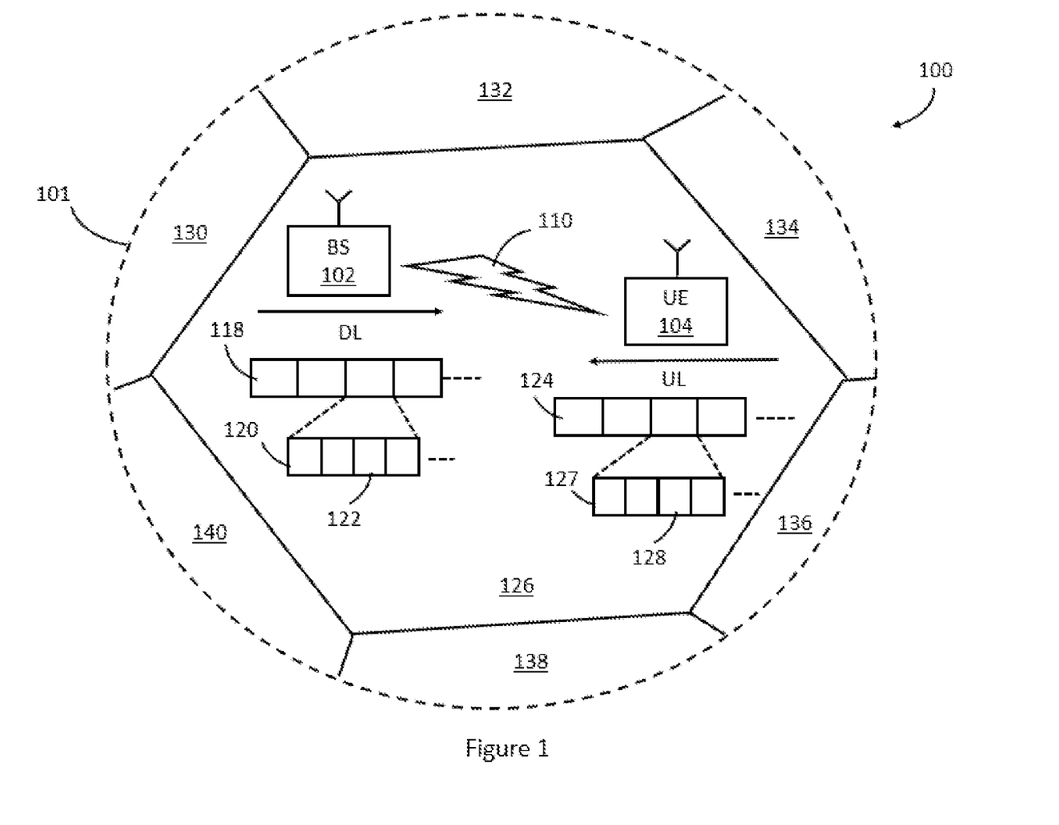
FIG. 1 illustrates an example cellular communication network in which techniques and other aspects disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (also referred to as "communication point 102" or "BS 102" or "transmitting receiving point (TRP)", or "communication node") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the communication point 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the communication point 102 may operate at an allocated channel transmission bandwidth to provide adequate coverage to the UE 104. The communication point 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the communication point 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
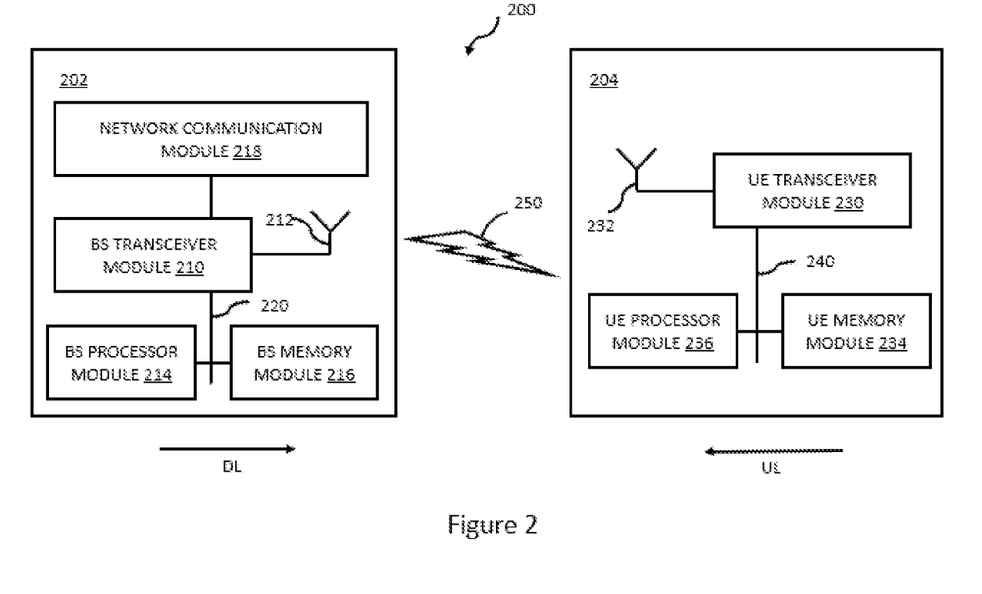
FIG. 2 illustrates block diagrams of an example base station and a user equipment device, in accordance with some embodiments of the present disclosure.

FIG. 2 illustrates a block diagram of an example wireless communication system 200 for transmitting and receiving wireless communication signals, e.g., orthogonal frequency-division multiplexing (OFDM)/orthogonal frequency-division multiple access (OFDMA) signals, in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (also referred to as "communication point 202") and a user equipment device 204 (hereinafter "UE 204"). The communication point 202 includes a the communication point (base station) transceiver module 210, a communication point antenna 212, a communication point processor module 214, a communication point memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The communication point 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the communication point transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the communication point 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

Having discussed aspects of a networking environment as well as devices that can be used to implement the systems, methods and apparatuses described herein, additional details shall follow.

In 5G NR, beam forming mechanism is utilized to improve the robustness of high frequency communications. The beam forming mechanism can include a beam indication for both uplink (UL) and downlink (DL) transmissions. For DL transmission, the beam indication mechanism can indicate to the UE that PDSCH (Physical Downlink Shared Channel) an/or PDCCH transmission use the same transmission beam configuration as reference signal (e.g., CSI-RS or SS block). In particular, the beam indication indicates to the UE that PDSCH and/or PDCCH is transmitted by the BS utilizing the same spatial filter as that utilized for the reference signal. The beam indication can be based on transmission configuration indication (TCI) states, which can include information about the reference signal. The UE can assume that the DL transmission of PDSCH and or PDCCH is carried out using the same spatial filter as the reference signal associated with the TCI.

For DL TCI can be configured or activated through RRC signaling, MAC-CE signaling, and downlink control information (DCI). The TCI state can be used to indicate the quasi-co-located (QCL) assumption of the DL signals and channels. It should be noted that QCL, and in particular QCL-Type D, can be regarded as indicating the DL beam. For UL transmissions, a valid spatial relation information for sounding reference signal (SRS) or physical uplink control channel (PUCCH) is configured or activated through radio resource control (RRC) signaling or media access control (e.g., MAC-CE signaling). The obtained spatial relation information can indicate the spatial relation of the SRS or the PUCCH. The reference signal (RS) can include synchronization signal/physical broadcast channel block (SSB), channel state information reference signal (CSI-RS), or SRS. The UE can use the same spatial filter as that for receiving or transmitting the references signals to transmit SRS or PUCCH. However, this beam indication mechanism for UL transmissions may result in undesirable overhead of signaling and resources.

As discussed herein, the UE can reduce the overhead by utilizing the beam determination during DL to determine the UL beam configuration, without having to carry out UL sounding or other methods to obtain the spatial relation for UL transmissions. With reference to the examples discussed herein, a "beam state" can be equivalent to a QCL state, a QCL assumption, a reference signal, TCI state, or a spatial relation information. In particular, a "QCL state" or a "TCI state" can include one or more of reference signals (RSs) (also referred to as QCL RSs) and their corresponding QCL type parameters. The QCL type parameters can in turn include at least one of the following aspects alone or in combination: Doppler spread, Doppler shift, delay spread, average delay, average gain, and spatial relation parameters. For example, a QCL type can include a "QCL-Type D", which is used to represent the same or quasi co-located spatial parameter between targeted RS or channel and the one or more references QCL-Type D RSs. The spatial relation information can include one or more reference RSs (also called spatial RSs) which is used to represent the same or quasi co-located spatial relation between targeted RS or channel and the one or more RSs. The QCL-Type D can be equivalent to a spatial parameter or a receiver parameter. With reference to the examples discussed herein, "beam" can be equivalent to QCL assumption, a spatial relation or a spatial filter. A QCL or QCL assumption can include at least one of the following alone or in combination: Doppler spread, Doppler shift, delay spread, average delay, average gain, and spatial relation parameters. The "spatial relation" or "spatial filter" can refer to the filter configuration at either the UE or at the BS. The spatial filter can also be referred to as a spatial domain transmission filter or a spatial domain filter. Further, a "frequency domain bandwidth" can refer to a serving cell or a carrier component (CC) or a bandwidth part (BWP). A UL signal can include a PUCCH, a PUCCH resource, a PUSCH, PUSCH resource, a SRS or a SRS resource. Furthermore, a DL signal can include a PDCCH, a PDSCH, or a CSI-RS. A codepoint, as referred to herein can include A (where A can be a positive integer) bits in the downlink control information (DCI) received from the BS. Each codepoint can correspond to an activated beam state. For example, a codepoint can be a TCI codepoint, which include 3 bits in the DCI, and each TCI codepoint (e.g., 000, 001, . . . , 111) can correspond to an activated beam state applicable to the DL signal. Further, a control resource set (CORESET) group index can refer to a CORESETPoolIndex. With reference to the examples discussed herein, "power control parameter" can include at least one of a path-loss reference signal (PL-RS), received target power (P0), a path-loss compensation coefficient (Alpha, which can be used to control the path-loss compensation), and closed loop process, which can represent a power control adjustment state. As referred to herein, a path-loss can refer to couple loss.

Embodiment 1

Figure 3:
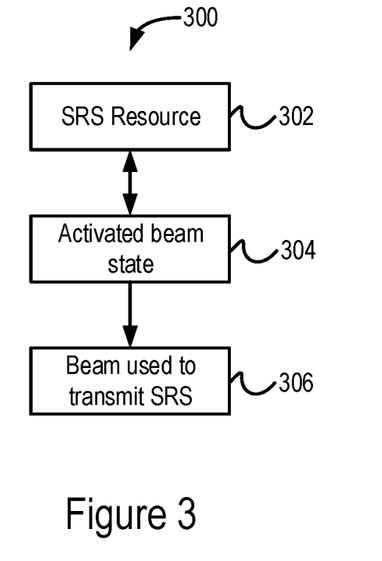
FIG. 3 shows a schematic diagram of a first example process to obtain a beam for transmitting uplink (UL) signals, in accordance with some embodiments of the present disclosure.

As mentioned above, the UE can reduce the overhead by utilizing the beam determination during DL to determine the UL beam configuration, without having to carry out UL sounding or other methods to obtain the spatial relation for UL transmissions. In one approach, the UE can obtain the beam according to the activated beam state associated with the UL resource, wherein the activated beam state is applicable to DL signal. Furthermore, the UE can obtain the beam state corresponding to a QCL RS (e.g., QCL-Type D RS) in the activated beam state (e.g., TCI state) associated with the SRS resource. Once the beam state is obtained, the UE can transmit the SRS according to the obtained beam state. FIG. 3 shows a schematic diagram of a first example process 300 to obtain a beam for transmitting UL signals. The process includes obtaining an activated beam state (304) associated with the SRS resource (302). The process further includes using the beam corresponding to the obtained beam state to transmit the SRS (306). In some examples, the activated beam state can meet at least one of the following features. For example, the activated beam state can be in the active DL BWP of the frequency domain bandwidth (e.g., serving cell), in other words, the activation command (e.g., MAC-CE) used to activate the activated beam state can be in the active DL BWP of the frequency domain bandwidth. The activated beam state is used to indicate the beam used for the DL signals. In particular, the activated beam state is determined from an activation command (e.g., MAC-CE) and is used to the beam for subsequent DL signals (e.g., PDSCH).

The UE can be configured using a SRS resource set that includes M SRS resources in the serving cell. The SRS resource IDs associated with the M SRS resources can be 0, 1, . . . , M−1. The serving cell can activate a TCI state set containing P (where P is a positive integer) activated TCI states (using an activation command, such as, e.g., MAC-CE) that are applicable to PDSCH transmitted on an active DL BWP in the serving cell. Each activated TCI state can include a QCL-Type D RS, which is used by the UE to obtain the beam used to receive the PDSCH. Furthermore, the SRS resource ID is associated with the activated TCI state ID. As an example, the first A SRS resource IDs (in ascending order) can be associated with A activated TCI state IDs (in ascending order) such that there is one-to-one correspondence between the SRS resource IDs and the TCI state IDs. If the number of SRS resources M is greater than or equal to P (the number of TCI states), then the number A of SRS resource IDs corresponding to the activated A TCI state IDs is equal to P (e.g., if M≥P, then A=P). On the other hand, if the number of SRS resources M is less than P (the number of TCI states), then the number A of SRS resource IDs corresponding to the activated A TCI state IDs is equal to M (e.g., if M≤P, then A=M). Table 1 below shows an example list of activated TCI state IDs and the corresponding SRS resource IDs where M=8, and P=5, resulting in A=P.

TABLE 1

| Activated TCI state IDs | SRS resource IDs |
| --- | --- |
| 2 | 0 |
| 15 | 1 |
| 33 | 2 |
| 58 | 3 |
| 66 | 4 |

In the example shown in Table 1, the UE can obtain the beam corresponding to QCL-Type D RS in the 1$^{st}$ activated TCI state (i.e., the activated TCI state corresponding to the TCI state ID=2) associated with the SRS resource ID=0. The UE can then transmit the SRS 0 according to the obtained beam.

Embodiment 2

Figure 4:
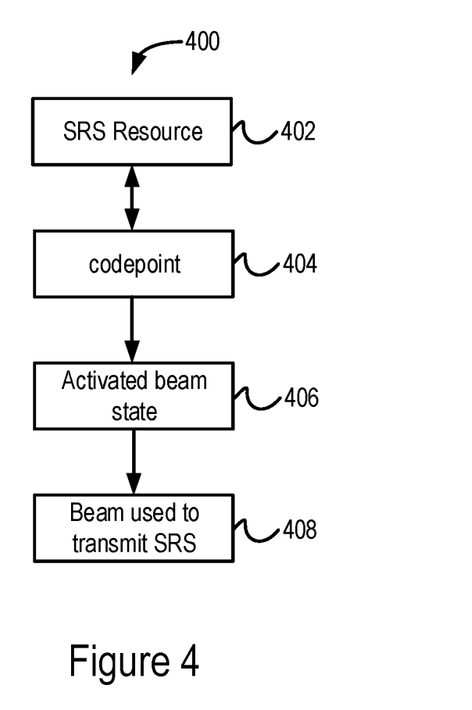
FIG. 4 shows a schematic of a second example process to obtain a beam for transmitting UL signals, in accordance with some embodiments of the present disclosure.

In another approach, the UE can obtain the beam according to the activated beam state corresponding to codepoint associated with UL resource, wherein the activated beam state is applicable to DL signal. Furthermore, the UE can obtain the beam corresponding to QCL RS (e.g., QCL-Type D RS) in the activated beam state (e.g., TCI state) corresponding to codepoint (e.g., TCI codepoint) associated with the SRS resource. The UE can then transmit the SRS signal based on the obtained beam. FIG. 4 shows a schematic of a second example process 400 to obtain a beam for transmitting UL signals. The process includes obtaining a codepoint (404) associated with an SRS resource (402). The UE can then obtain an activated beam state corresponding to the codepoint associated with the SRS resource (406). The UE can then use the beam corresponding to the obtained beam state to transmit the SRS resource (408). In some examples, the UE can obtain the beam corresponding to the QCL RS (e.g., QCL-Type D RS) in the activated beam state (e.g., TCI state) corresponding to the codepoint (e.g., TCI codepoint) associated with the SRS resource. The UL resource (e.g., the SRS resource) is associated with the codepoint (e.g., TCI codepoint), which includes at least one of the following aspects: (1) The UL resource is associated with the codepoint based on a first command, which can include at least one of: an RRC, a MAC-CE, or a DCI, (2) the codepoint can be one type of information in the high layer configuration UL resource (e.g., SRS-SpatialRelationInfo or SRS-Resource), or (3) the codepoint can be one type of information in a beam state (e.g., TCI state), and the beam state can be one type of information included in the high layer configuration or SRS resource (e.g., SRS-SpatialRelationInfo or SRS-Resource).

The UE can be configured using a SRS resource set that includes M SRS resources in the serving cell. The SRS resource IDs associated with the M SRS resources can be 0, 1, . . . , M−1. The serving cell can activate a TCI state set containing P (where P is a positive integer) activated TCI states (using an activation command, such as, e.g., MAC-CE), where each activated TCI state can include a QCL-Type D RS, which can be used by the UE to obtain the beam used to receive the PDSCH. Each TCI codepoint can correspond to one activated TCI state. For example, Table 2 below shows an example list of TCI codepoints and the corresponding activated TCI states.

TABLE 2

| TCI codepoint | Activated TCI state IDs |
| --- | --- |
| 000 | 5 |
| 001 | 9 |
| 010 | 16 |
| 100 | 30 |
| 011 | 45 |
| 101 | 66 |
| 110 | 80 |
| 111 | 115 |

In particular, Table 2 assumes that P=8 and shows the relationship between the TCI codepoints and the corresponding activated TCI states IDs. Further, the SRS resource can be associated with the TCI codepoint based on the first command discussed above (e.g., RRC). Assuming that M=8, Table 3 below shows the association between the SRS resource and the TCI codepoint.

TABLE 3

| SRS resource ID | TCI codepoint |
|---|---|
| 0 | 000 |
| 1 | 001 |
| 2 | 010 |
| 3 | 100 |
| 4 | 011 |
| 5 | 101 |
| 6 | 110 |
| 7 | 111 |

In particular, Table 3 shows a mapping between the SRS resource ID and the TCI codepoint. In one example, the UE can obtain the beam according to QCL-Type D RS in the activated TCI state (i.e., activated TCI state ID=5) corresponding to the TCI codepoint "000" associated with SRS resource ID=0. The UE can then transmit SRS 0 according to the obtained beam. In another example, the UE can obtain the beam according to QCL-Type D RS in the activated TCI state (i.e., activated TCI state ID=9) corresponding to the TCI codepoint "001" associated with SRS resource ID=1. The UE can then transmit the SRS 1 using the obtained beam.

Embodiment 3

In yet another approach, the UE can determine a codepoint associated with and SRS resource based on the following information: (1) the association between the SRS resource ID and the TCI codepoint (e.g., a mapping table), (2) a first message, which can be used to indicate the codepoint associated with the SRS resource (i.e., indicate an index of the mapping table), or (3) a CORESET group index associated PDCCH scheduling the SRS transmission. In some examples, the type of SRS resource set can be aperiodic.

Figure 5:
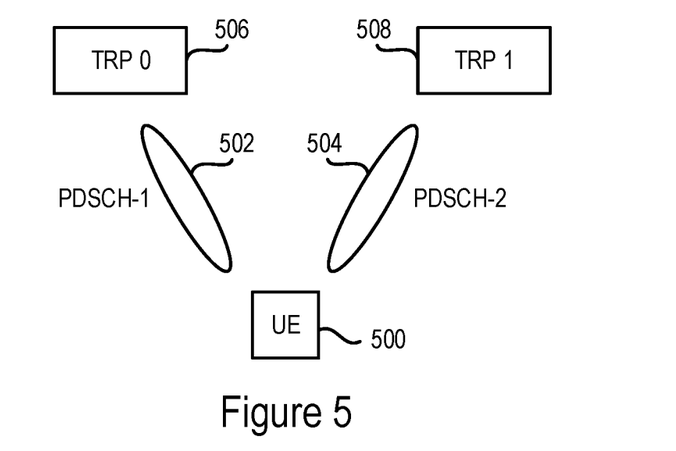
FIG. 5 shows an example user equipment (UE) receiving a Physical Downlink Shared Channel-1 (PDSCH-1) and a PDSCH-2 from a transmit-receive point-0 (TRP0) and a transmit receive point-1 (TRP1), respectively, in accordance with some embodiments of the present disclosure.

The UE can be configured using a SRS resource set that includes M SRS resources in the serving cell. The SRS resource IDs associated with the M SRS resources can be 0, 1, ..., M−1. The serving cell can activate two TCI state sets, one set associated with PDSCH-1 and another set associated with PDSCH-2. In some examples, more than two TCI sets can be utilized that are associated with more than two PDSCHs. Each TCI state set can include P activated TCI states. The PDSCH-1 and the PDSCH-2 can be transmitted simultaneously or not simultaneously based on space division multiplexing (SDM), frequency division multiplexing (FDM) or time division multiplexing (TDM). FIG. 5 shows an example UE 500 receiving the PDSCH-1 502 and the PDSCH-2 504 from a transmit-receive point-0 (TRP0) 506 and a transmit receive point-1 (TRP1) 508, respectively. Each activated TCI state includes a QCL-Type D RS, which is used by the UE to obtain the beam of PDSCH-1 or -2 (i.e., the beam used to receive PDSCH-1 or -2). Furthermore, each TCI codepoint corresponds to one activated TCI state. In one example, P=8, for PDSCH 1. The corresponding relationship between TCI codepoint and activated TCI state ID is shown in Table 4 below. Similarly, for PDSCH 2, the corresponding relationship between TCI codepoint and activated TCI state ID is shown in Table 5 below.

TABLE 4

| TCI codepoint | Activated TCI state IDs |
|---|---|
| 000 | 2 |
| 001 | 7 |
| 010 | 15 |
| 100 | 30 |
| 011 | 45 |
| 101 | 66 |
| 110 | 92 |
| 111 | 115 |

TABLE 5

| TCI codepoint | Activated TCI state IDs |
|---|---|
| 000 | 5 |
| 001 | 9 |
| 010 | 16 |
| 100 | 40 |
| 011 | 51 |
| 101 | 80 |
| 110 | 100 |
| 111 | 120 |

Furthermore, the SRS resource is associated with the TCI codepoint. Table 6 and Table 7 below show example mapping between the SRS resource IDs, the TCI codepoints, and the activated TCI state IDs for PDSCH-1 and the PDSCH-2.

TABLE 6

| SRS resource ID | TCI codepoint | Activated TCI state IDs |
|---|---|---|
| 0 | 000 | 2 |
| 1 | 001 | 7 |
| 2 | 010 | 15 |
| 3 | 100 | 30 |
| 4 | 011 | 45 |
| 5 | 101 | 66 |
| 6 | 110 | 92 |
| 7 | 111 | 115 |

TABLE 7

| SRS resource ID | TCI codepoint | Activated TCI state IDs |
|---|---|---|
| 0 | 000 | 5 |
| 1 | 001 | 9 |
| 2 | 010 | 16 |
| 3 | 100 | 40 |
| 4 | 011 | 51 |
| 5 | 101 | 80 |
| 6 | 110 | 100 |
| 7 | 111 | 120 |

In particular, Tables 6 and 7 show the mapping for M=8. Each SRS resource ID is associated with one TCI codepoint for PDSCH 1 or PDSCH 2. For example, if the value of a first message is 1, that is, according to Table 6, the UE can obtain the beam corresponding to QCL-Type D RS in the activated TCI state (i.e., activated TCI state ID=2) corresponding to the TCI codepoint "000" associated with the SRS resource ID=0. The UE can then transmit the SRS 0 according to the obtained beam. As another example, if the value of first message is 2, according to Table 7, the UE can obtain the beam corresponding to QCL-Type D RS in the activated TCI state (i.e., activated TCI state ID=5) corresponding to the TCI codepoint "000" associated with the SRS resource ID=0. The UE can then transmit the SRS 0 according to the obtained beam.

The resource type of the SRS source set mentioned above is aperiodic, and assumes that the aperiodic SRS resource set is triggered (or scheduled) by PDCCH 3. PDCCH 3 is associated with CORESETPoolIndex=1. In addition, PDCCH 1 and PDCCH 2 is associated with CORESET-PoolIndex=1 and CORESETPoolIndex=2 respectively. It is obviously that CORESETPoolIndex associated with PDCCH 3 is same as that associated with PDCCH 1. Therefore, according to Table 6 (i.e., the association between SRS resource ID and TCI codepoint for PDSCH 1), the UE can obtain the beam corresponding to QCL-Type D RS in the activated TCI state (i.e., activated TCI state ID=2) corresponding to the TCI codepoint "000" associated with the SRS resource ID=0. The UE can then transmit the SRS 0 according to the obtained beam.

Embodiment 4

Figure 6:
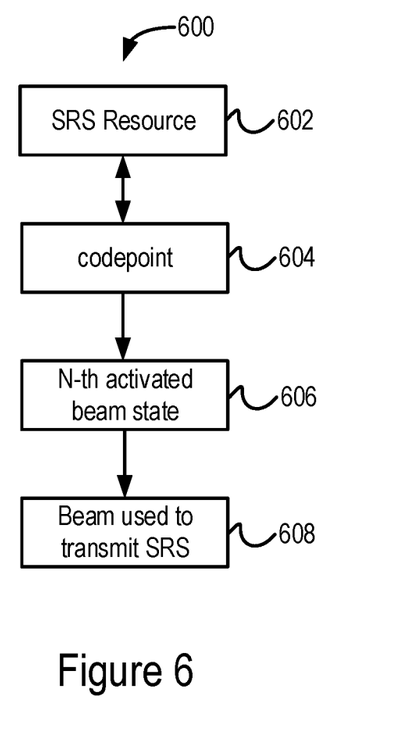
FIG. 6 shows a schematic of a third example process to obtain a beam for transmitting UL signals, in accordance with some embodiments of the present disclosure.

In another approach, the UE can obtain the beam corresponding to QCL RS (e.g., QCL-Type D RS) in the Nth activated beam state (e.g., TCI state) corresponding to a codepoint (e.g., TCI codepoint) associated with the SRS resource. The UE can then transmit the SRS signal based on the obtained beam. FIG. 6 shows a schematic of a third example process 600 to obtain a beam for transmitting UL signals. The process 600 includes obtaining a codepoint (604) associated with an SRS resource (602). The UE can then obtain an Nth activated beam state corresponding to the codepoint associated with the SRS resource (606). The UE can then use the beam corresponding to the obtained beam state to transmit the SRS resource (608). In some examples, the UE can determine the activated beam state corresponding to the codepoint (e.g., TCI codepoint) associated with SRS resource according to second message, where the second message is used to indicate the index of the activated beam state corresponding to the codepoint associated with SRS resource.

The UE can be configured using a SRS resource set that includes M SRS resources in the serving cell. The SRS resource IDs associated with the M SRS resources can be 0, 1, . . . , M−1. This serving cell can activate a TCI state set containing P activated TCI states that are applied to the PDSCH-1 and (or) the PDSCH-2 transmitted on an active DL BWP in this serving cell through an activation command (e.g. MAC-CE), where PDSCH 1 and PDSCH 2 can be transmitted simultaneously or not simultaneously based on SDM, FDM or TDM. For example, as shown in FIG. 5, PDSCH-1 502 and PDSCH-2 504 are received from TRP 0 506 and TRP 1 508, respectively. Each activated TCI state includes a QCL-Type D RS, which is used by the UE to obtain the beam of PDSCH-1 or -2 (i.e., the beam used to receive PDSCH-1 or -2). Furthermore, each TCI codepoint corresponds to one or two activated TCI states. When the TCI codepoint corresponds to two activated TCI states, the first activated TCI state is applicable to PDSCH-1, and the second activated TCI state is applicable to PDSCH-2. As an example, assume that P=12, then the corresponding relationship between TCI codepoint and activated TCI state ID is shown in Table 8. Furthermore, the SRS resource is associated with the TCI codepoint by the first command (e.g., RRC). Specifically, suppose that M=16, as shown in Table 9, each SRS resource is associated with one TCI codepoint.

TABLE 8

| TCI codepoint | Activated TCI state IDs |
|---|---|
| 000 | 2, 5 |
| 001 | 7 |
| 010 | 15, 16 |
| 100 | 30 |
| 011 | 45 |
| 101 | 66, 80 |
| 110 | 92, 100 |
| 111 | 115 |

TABLE 9

| SRS resource ID | TCI codepoint |
|---|---|
| 0 | 000 |
| 1 | 001 |
| 2 | 010 |
| 3 | 100 |
| 4 | 011 |
| 5 | 101 |
| 6 | 110 |
| 7 | 111 |

For example, the value of second message is 1, the UE can obtain the beam corresponding to QCL-Type D RS in the $1^{st}$ activated TCI state (i.e., activated TCI state ID=2) corresponding to the TCI codepoint "000" associated with the SRS resource ID=0. The UE can then transmit the SRS 0 according to the obtained beam. As another example, if the value of second message is 2, the UE can obtain the beam corresponding to QCL-Type D RS in the $2^{nd}$ activated TCI state (i.e., activated TCI state ID=5) corresponding to the TCI codepoint "000" associated with the SRS resource ID=0. The UE can then transmit the SRS 0 according to the obtained beam.

In some examples, the first message can meet at least one of the following aspects: (1) the first message can be configured by a second command, which can include for example, RRC, MAC-CE, or DCI, (2) the first message can be one type of information in the high layer configuration of UL resources (e.g., SRS-SpatialRelationInfo or SRS-Resource), or (3) the first message can be one type of information in the beam state (e.g., TCI state), and the beam state can be one type of information in the high layer configuration of SRS resource (e.g., SRS-SpatialRelationInfo or SRS-Resource).

In some examples, the second message can meet at least one of the following aspects: (1) the second message can be configured by a third command, which can include for example, RRC, MAC-CE, or DCI, (2) the second message can be one type of information in the high layer configuration of UL resources (e.g., SRS-SpatialRelationInfo or SRS-Resource), or (3) the second message can be one type of information in the beam state (e.g., TCI state), and the beam state can be one type of information in the high layer configuration of SRS resource (e.g., SRS-SpatialRelationInfo or SRS-Resource).

In some examples, for any of the above discussed embodiments, the UE can obtain power control parameter (e.g., PL-RS) in the same way as the beam. For example, the UE can obtain PL-RS of the UL signal according to the activated beam state associated with the UL resource. Furthermore, the UE can obtain PL-RS of SRS corresponding to a reference signal (e.g., QCL-Type D RS) in the activated beam state (e.g., TCI state) associated with the UL resource (SRS resource). And, the UE can then use the PL-RS of SRS to calculate the pathloss of the SRS.

In some examples, for any of the above discussed embodiments, if a first type of predefined condition is met, the UE can obtain a spatial filter for SRS and/or the PL-RS of SRS according to the TCI state (or corresponding to the TCI codepoint) associated with the SRS resource. Furthermore, the first type of precondition includes at least one of the following conditions: (1) the UE receives an activation command (e.g., MAC-CE), or (2) a predefined parameter is set to "enable," which can indicate to the UE to obtain the spatial filter for transmitting the SRS according to the TCI state (or corresponding to the TCI codepoint) associated with the SRS resources.

In some examples, for any of the above discussed embodiments, after the UE receives an initial high layer configuration of TCI states and (or) before the reception of an activation command: (1) the UE can obtain the spatial filter for transmitting the SRS according to the SSB determined in the initial access procedure, (2) the UE can calculate the PL of the SRS using a RS resource obtained from the SS/PBCH block that the UE uses to obtain the master information block (MIB), or (3) the UE may not transmit SRS.

In some examples, for any of the above discussed embodiments, if a second type of predefined condition is met, the UE may refrain from transmitting SRS. The second type of predefined condition can include, for example: (1) no activated TCI state associated with the SRS resource, or (2) no activated TCI states corresponding to the TCI codepoint associated with the SRS resource.

In some examples, the discussion for transmitting of SRS of any of the above discussed embodiments can be equally applicable to transmitting of the PUCCH. That is the 'SRS' or 'SRS resource' or 'SRS resource ID' can be instead replaced with 'PUCCH', or 'PUCCH resource' or 'PUCCH resource ID.' Similarly, 'SRS resource set' can be replaced with 'PUCCH group' or 'PUCCH resource group'.

In some examples, for any of the above discussed embodiments, unless otherwise specified, the resource type of SRS can include at least one type of periodic, semi-persistent or aperiodic.

In one embodiment, a method includes determining, by a wireless communication device, one or more activated beam states, wherein the one or more activated beam states is applicable to a downlink (DL) signal. The method further includes determining, by the wireless communication device based at least on the one or more activated beam states, a first information, where the first information includes at least one of a beam of an uplink (UL) signal or a power control parameter of an UL signal. The method also includes transmitting, by the wireless communication device, the UL signal.

In some embodiments, the one or more activated beam states comprises a reference signal, and where the first information of the UL signal is determined according to the reference signal. In some embodiments, the one or more activated beam states belongs to a plurality of activated beam states, wherein the UL signal belongs to a plurality of UL signals, and wherein one of the plurality of activated beam states is associated with the respective one of plurality of UL signals in order. In some embodiments, the one of the plurality of activated beam states is associated with the respective one of the plurality of UL signals in order based on a first command, wherein the first command includes at least one of an RRC, a MAC-CE, or a DCI.

In some embodiments, the method further includes associating one or more codepoints with the UL signal, wherein the one or more activated beam state is associated with one of the one or more codepoints. In some embodiments, the one of the one or more codepoints is one type of information in a high layer configuration of the UL signal. In some embodiments, the one of the one or more codepoints is one type of information in the one or more activated beam states, and the one or more activated beam state is one type of information in a high level configuration of the UL signal. In some embodiments, the method further includes selecting, by the wireless communication device, one of the one or more codepoints according to a first message, and selecting, by the wireless communication device, one of the one or more activated beam states associated the one of the one or more codepoints for determining the first information according to a second message.

In some embodiments, the first message includes at least one aspect of a list of aspects comprising: the first message being configured by a second command, wherein the second command includes at least one of an RRC, a MAC-CE, or a DCI, the first message being one type of information in a high layer configuration of the UL signal, and the first message being one type of information in the beam state, and the beam state being one type of information in the high layer configuration of the UL signal. In some embodiments, the second message includes at least one aspect of a list of aspects comprising: the second message being configured by a third command, wherein the third command includes at least one of an RRC, a MAC-CE, or a DCI, the second message being one type of information in a high layer configuration of the UL signal, and the second message being one type of information in the beam state, and the beam state being one type of information in the high layer configuration of the UL signal.

In some embodiments, the method further includes at least one of: receiving, by the wireless communication device, an activation command, and receiving, by the wireless communication device, an predefined parameter that is set to 'enable'. In some embodiments, the method further includes not transmitting, by the wireless communication device, a subsequent UL signal, in this case that the precluding the activated beam states associated with the UL signal. In some embodiments, the method further includes determining, by the wireless communication device, the first information based at least on an SSB determined in an initial access procedure. In some embodiments, the one or more activated beam states satisfies a condition including at least one of: the one or more activated beam states is in an active downlink bandwidth part of a frequency domain bandwidth, or the one or more activated beam states is applicable to a PDSCH. In some embodiments, the UL signal includes at least one of: a PUCCH, a PUSCH, an aperiodic SRS, a semi-persistent SRS, or a periodic SRS.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein.

Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A method, comprising:
   receiving, by a wireless communication device, an activation command, wherein the activation command activates one or more activated transmission configuration indicator (TCI) states;
   determining, by the wireless communication device, an activated TCI state from the one or more activated TCI states, wherein the activated TCI state is applicable to a downlink (DL) signal and corresponds to a codepoint of a TCI field of a downlink control information (DCI) and the codepoint is determined according to the DCI, wherein the activated TCI state is applicable to the DL signal responsive to the activated TCI state including one or more reference signals (RSs) and corresponding quasi co-location (QCL) type parameters, and the DL signal and each of the one or more reference signals (RSs) satisfying a QCL relationship with respect to the corresponding QCL type parameter;
   determining, by the wireless communication device based at least on the activated TCI state, a first information, wherein the first information includes a beam of an uplink (UL) signal and a power control parameter of the UL signal; and transmitting, by the wireless communication device, the UL signal according to the first information, wherein the UL signal includes an aperiodic sounding reference signal (SRS).

2. The method of claim 1, wherein the one or more activated TCI states comprises a reference signal, and wherein the first information is determined according to the reference signal.

3. The method of claim 1, wherein the one or more activated TCI states belong to a plurality of activated TCI states, wherein the UL signal belongs to a plurality of UL signals, and wherein one of the plurality of activated TCI states is associated with a respective one of plurality of UL signals in order.

4. The method of claim 3, wherein the one of the plurality of activated TCI states is associated with the respective one of the plurality of UL signals in order based on a first command, wherein the first command includes at least one of a radio resource control (RRC), a medium access control element (MAC-CE), or a downlink control information (DCI).

5. The method of claim 1, further comprising:
associating one TCI codepoint with the UL signal, wherein the one or more activated TCI state are associated with the one TCI codepoint, wherein the TCI codepoint is a codepoint of TCI field of DCI.

6. The method of claim 5, wherein the one TCI codepoint is one type of information in the one or more activated TCI states, and the one or more activated TCI states are one type of information in a high level configuration of the UL signal.

7. The method of claim 1, wherein the TCI codepoint is determined according to a first message which satisfies at least one of following features:
the first message is configured by a second command, wherein the second command comprises the DCI;
the first message being one type of information in a high layer configuration of the UL signal; or
the first message being one type of information in the TCI state, and the TCI state being one type of information in the high layer configuration of the UL signal.

8. The method of claim 1, further comprising:
receiving, by the wireless communication device, a predefined parameter that is set to 'enable' which indicate to the wireless communication device to obtain the first information of the UL signal according to the TCI state corresponding to the TCI codepoint.

9. The method of claim 1, wherein the UL signal includes at least one of: a physical uplink control channel (PUCCH), a physical uplink shared channel (PUSCH), an aperiodic sounding reference signal (SRS), a semi-persistent SRS, or a periodic SRS.

10. A wireless communication device, comprising:
at least one processor configured to:
receive an activation command, wherein the activation command activates one or more activated transmission configuration indicator (TCI) states;
determine an activated TCI state from the one or more activated TCI states, wherein the activated TCI state is applicable to a downlink (DL) signal and corresponds to a codepoint of a TCI field of a downlink control information (DCI) and the codepoint is determined according to the DCI, wherein the activated TCI state is applicable to the DL signal responsive to the activated TCI state including one or more reference signals (RSs) and corresponding quasi co-location (QCL) type parameters, and the DL signal and each of the one or more reference signals (RSs) satisfying a QCL relationship with respect to the corresponding QCL type parameter;
determine, based at least on the activated TCI state, a first information, wherein the first information includes a beam of an uplink (UL) signal and a power control parameter of the UL signal; and
transmit, via a transmitter, the UL signal according to the first information,
wherein the UL signal includes an aperiodic sounding reference signal (SRS).

11. The wireless communication device of claim 10, wherein the one or more activated TCI states comprises a reference signal, and wherein the first information is determined according to the reference signal.

12. The wireless communication device of claim 10, wherein the TCI codepoint is selected according to a first message, wherein at least one of:
the first message is configured by a second command, wherein the second command comprises the DCI;
the first message is one type of information in a high layer configuration of the UL signal; or
the first message is one type of information in the TCI state, and the one activated TCI state being one type of information in the high layer configuration of the UL signal.

* * * * *

UNITED STATES PATENT AND TRADEMARK OFFICE
CERTIFICATE OF CORRECTION

PATENT NO. : 12,262,223 B2
APPLICATION NO. : 17/853171
DATED : March 25, 2025
INVENTOR(S) : Zhen He et al.

It is certified that error appears in the above-identified patent and that said Letters Patent is hereby corrected as shown below:

In the Claims

In Claim 1, Column 16, Line 51: please delete "more activated transmission" and insert -- more transmission --

In Claim 2, Column 17, Line 9: please delete "activated TCI states" and insert -- TCI states --

In Claim 3, Column 17, Line 13: please delete "activated TCI states belong to a plurality of activated TCI" and insert -- TCI states belong to a plurality of TCI --

In Claim 3, Column 17, Line 16: please delete "one of plurality" and insert -- one of the plurality --

In Claim 4, Column 17, Line 19: please delete "activated TCI states" and insert -- TCI states --

In Claim 5, Column 17, Line 27: please delete "activated TCI state" and insert -- TCI states --

In Claim 6, Column 17, Lines 31-32: please delete "activated TCI states, and the one or more activated TCI" and insert -- TCI states, and the one or more TCI --

In Claim 8, Column 17, Line 48: please delete "according to the TCI" and insert -- according to the activated TCI --

In Claim 9, Column 18, Line 1: please delete "UL signal includes" and insert -- UL signal further includes --

In Claim 10, Column 18, Line 9: please delete "more activated transmission" and insert -- more transmission --

In Claim 10, Column 18, Line 12: please delete "activated TCI states" and insert -- TCI states --

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 12,262,223 B2

In Claim 11, Column 18, Line 34: please delete "more activated TCI" and insert -- more TCI --

In Claim 12, Column 18, Lines 44-45: please delete "in the TCI state, and the one activated" and insert -- in the activated TCI state, and the activated --